(12) United States Patent
Gabet et al.

(10) Patent No.: US 6,262,604 B1
(45) Date of Patent: Jul. 17, 2001

(54) DIGITAL SYNTHESIZER OF SIGNALS

(75) Inventors: Pascal Gabet, Chaville; Jean-Luc de Gouy, Briis sous Forges, both of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/339,100

(22) Filed: Jun. 24, 1999

(30) Foreign Application Priority Data

Jul. 3, 1998 (FR) .................................................. 98 08553

(51) Int. Cl.$^7$ .................................................. H03B 19/00
(52) U.S. Cl. ........................ 327/107; 327/105; 708/271
(58) Field of Search .................................. 327/105, 107, 327/106, 113, 114; 708/271

(56) References Cited

U.S. PATENT DOCUMENTS

| | | | |
|---|---|---|---|
| 4,901,265 | * 2/1990 | Kerr et al. ............................ | 364/721 |
| 5,014,231 | * 5/1991 | Reihhard et al. ..................... | 327/107 |
| 5,459,680 | * 10/1995 | Zimmerman et al. ................ | 327/105 |
| 5,729,182 | 3/1998 | Fousset et al. ......................... | 331/17 |

FOREIGN PATENT DOCUMENTS

| | | |
|---|---|---|
| 0 887 941 A1 | 12/1998 | (EP) . |
| WO 89/06009 | 6/1989 | (WO) . |

* cited by examiner

*Primary Examiner*—Dinh T. Le
(74) *Attorney, Agent, or Firm*—Oblon, Spivak, McClelland, Maier & Neustadt, P.C.

(57) ABSTRACT

A digital frequency synthesizer comprises means for the generation of the samples of a digital signal to be converted into an analog signal encoded on N bits as a function of a frequency control word, means for the generation of a noise signal encoded on N bits, and a digital-analog converter, the useful signal and the noise signal being truncated to M bits before being added up by an adder. The result of the addition is converted into analog signal form by the digital-analog converter. The generated noise has at least a noise density substantially equal to a law of equiprobability, this density being zero outside a given space. Application especially to direct digital synthesis, for example in the field of radar techniques or that of instrumentation.

12 Claims, 7 Drawing Sheets

DIGITAL SYNTHESIZER OF SIGNALS

BACKGROUND OF THE INVENTION

The present invention relates to a digital synthesizer of signals. It can be applied especially to direct digital frequency synthesis, for example in the field of radar technology or in that of instrumentation.

Direct digital synthesis is a technique of frequency synthesis by which the samples of a signal to be generated are prepared in tile form of digital values and then converted into analog signal form by means of a digital-analog converter. The signal synthesizers obtained by this technique are highly valuable in terms of volume, weight and energy consumption because they enjoy the advantage of large-scale integration. Their other particular advantages are very high resolution and very short times of switching from one frequency to another.

In general, the digital-analog converter has a resolution of less than the number N of useful digital bits of the signal that is prepared for conversion into an analog signal. The passage from N bits to M bits, which is the resolution of the digital-analog converter, generates a quantification error. Owing to this quantification, the transfer function of the digital-analog converter, namely the output voltage from the converter as a function of the input digital words, is a stepped function.

In these digital synthesizers, the spectral purity is furthermore limited by the non-linearities of the digital-analog converters that they contain. The non-linearities designate the fact that the steps of the transfer function of the digital-analog converter are not of equal height and that the transition between steps produces irregular phenomena. These non-linearities lead to the generation of harmonic frequencies that are aliased owing to the sampling. Parasitic lines are thus created, a parasitic line being a spectral component located at frequencies different from the fundamental frequency of the signal to be synthesized.

SUMMARY OF THE INVENTION

One aim of the invention is to enable an improvement in the spectral purity of the digital synthesizers of signals by reducing the effect of the non-linearities of the digital-analog converters that they contain. To this end, an object of the invention is a signal synthesizer comprising means for the generation of the samples of a digital signal to be converted, encoded on N bits, into an analog signal as a function of a frequency control word, means for the generation of a noise signal encoded on N bits, the useful signal and the noise signal being added up by an adder, M most significant bits of the result of the addition being converted into analog signals by the digital-analog converter, M being smaller than N, the means for the generation of a noise signal comprising at least means for the generation of a sampled and equiprobable white noise, means for interposing a zero between two noise samples and means for the symmetrical pulsed response filtering of the samples with an offset of one sampling half-period so that the noise has at least a noise density substantially equal to the law of equiprobability, this density being zero outside a given space, and the histogram of the noise being stationary.

BRIEF DESCRIPTION OF THE DRAWINGS

The main advantages of the invention are that it enables a reduction in truncation noises, and is simple to implement and economical.

Other features and advantages of the invention shall appear from the following description, made with reference to the appended drawings, of which.

MORE DETAILED DESCRIPTION

Figure 1:
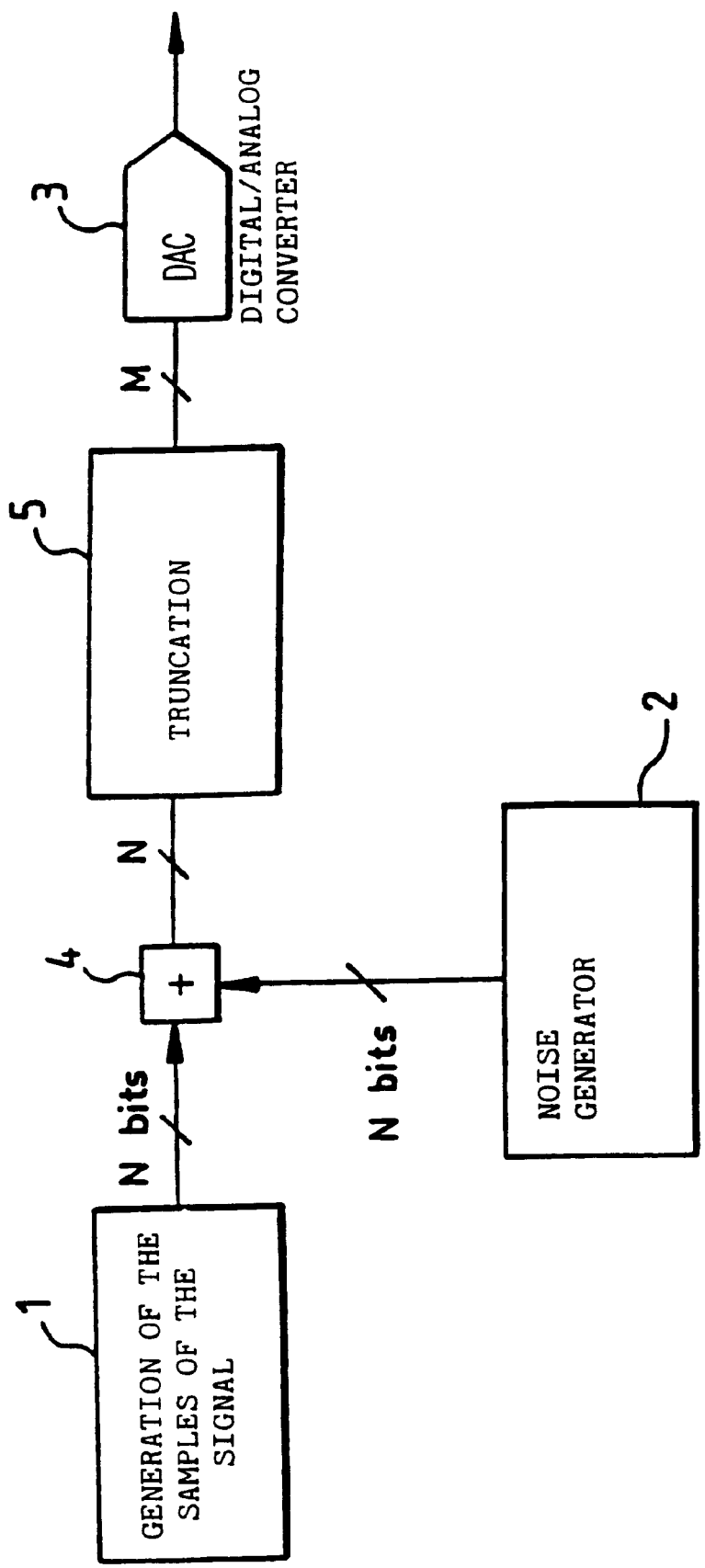
FIG. 1 is a block diagram showing a first exemplary implementation of a synthesizer according to the invention.

FIG. 1 is a block diagram showing a first possible embodiment of a synthesizer according to the invention. The synthesis of a signal consists especially of the creation of an analog signal from a frequency control word made for example in digital form. It comprises especially means 1 for the generation of the samples of the useful signal, means 2 for the generation of noise samples and a digital-analog converter 3. By injecting noise with a specific histogram and spectral distribution, it is possible especially to reduce the non-linearities. This noise indeed has an amplitude close to the amplitude of the useful signal, preferably equal to or greater than this amplitude. It furthermore has a density of probability close to or substantially equal to that corresponding to the law of equiprobability, this density being zero outside a given space. A filter (not shown) is for example wired to the output of the digital-analog converter 3 to filter the noise due to the noise generator 2 and thus provide the expected useful signal. In general, the useful signal is a to narrow band signal and may vary in a band of frequency below the clock frequency, thus leaving a spectral space available for placing the noise.

Figure 2:
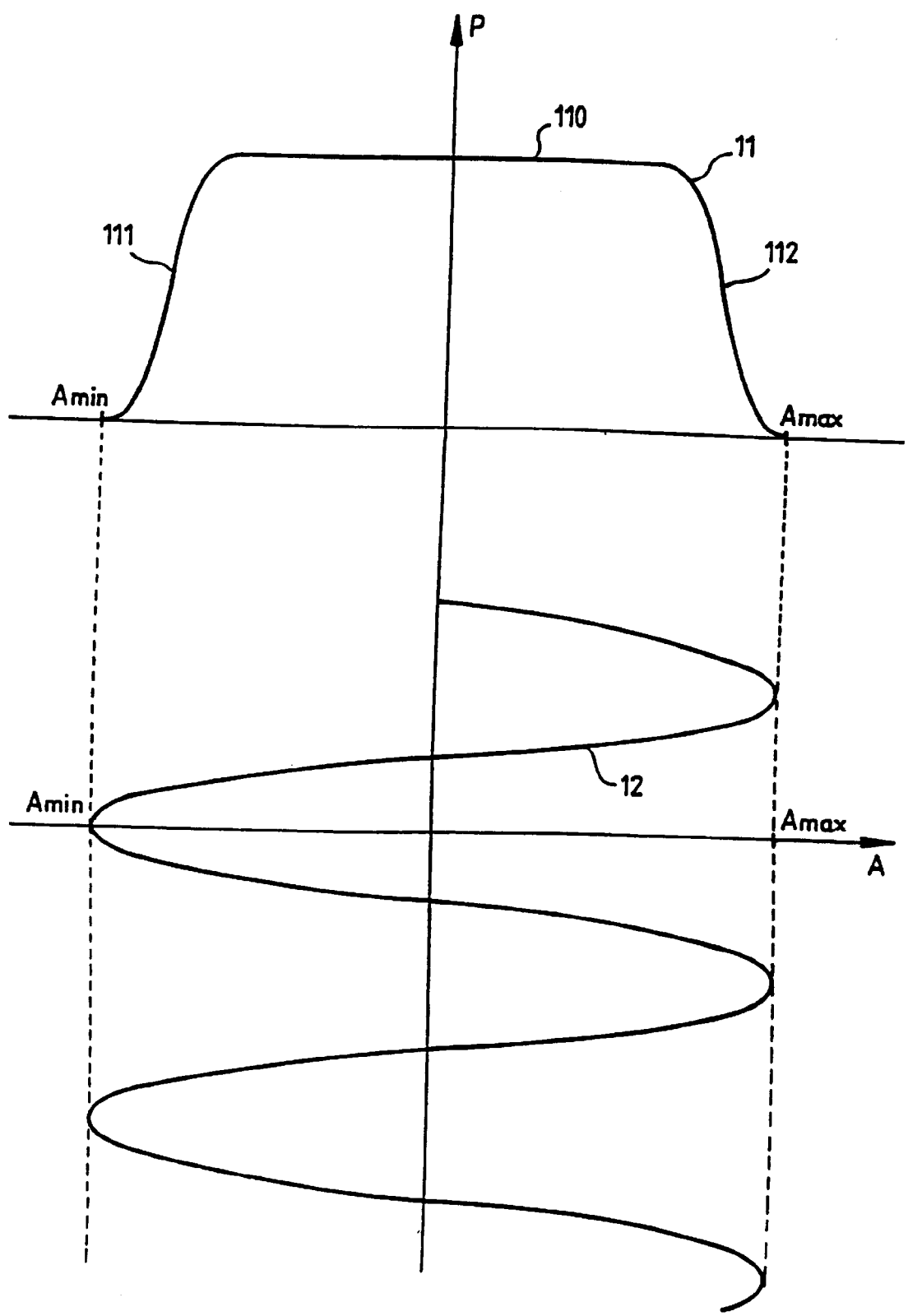
FIG. 2 is an exemplary histogram of noise generated in a synthesizer according to the invention.

FIG. 2 shows an exemplary histogram of the noise generated by the noise generator 2. FIG. 2 shows a first curve 11 with a representation, on the Y axis, of the probability P that the amplitude of the noise will be included in a given interval [A, A+dA]. To this end, the y-axis represents the probability P of appearance of the noise and the x-axis the amplitude of the noise. The amplitude of the noise ranges between a value $A_{min}$ and a value $A_{max}$ defining an interval $[A_{min}, A_{max}]$. These values are substantially equal or close to the minimum and maximum amplitudes of the useful signal or are even greater than these amplitudes. This useful signal is represented, besides, by a curve 12 evolving between the values $A_{min}$ and $A_{max}$. The probability P of the noise is substantially constant in the interval between these values $A_{min}$ and $A_{max}$. The density of probability of the noise is therefore substantially equal to the probability given by a law of equiprobable density.

Figure 3:
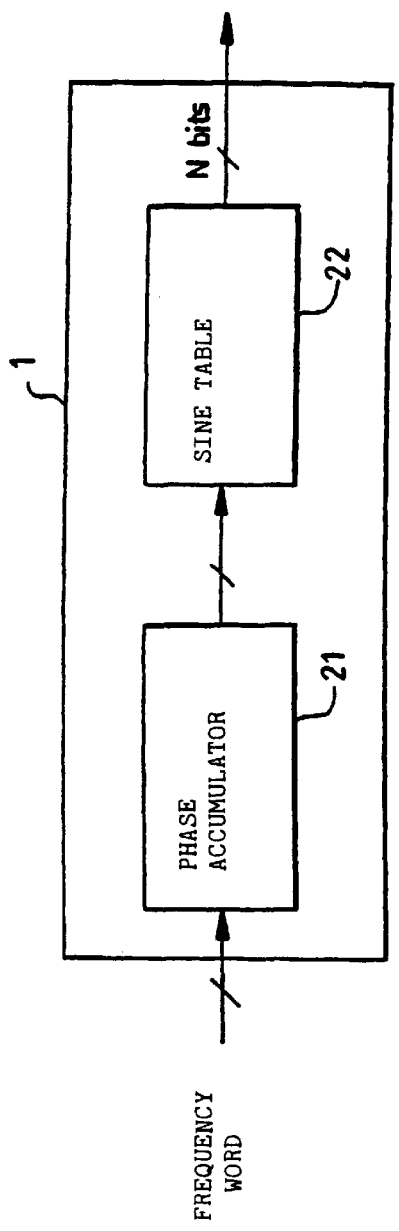
FIG. 3 shows an exemplary embodiment of means for the preparation, from a control word, of the digital signal that is to be converted into an analog signal.

FIG. 3 shows an exemplary embodiment of the means 1 for the generation of samples of the useful signal. This useful signal is the digital signal to be converted into analog signals. The samples are digital data elements. The generation means 1 comprise for example, in the particular case of a sine signal, a phase accumulator 21 and a memory 22 containing the sine function. The means 1 for the generation of digital samples of the sine signal to be synthesized receive a frequency control digital word, hereinafter called a frequency word, and a clock signal. This frequency word is given to the phase accumulator 21. This phase accumulator comprises for example a generator of digitized ramps delivered to the address bus of the memory 22 of the sine function. A digitized ramp is a sequence of numerical values regularly increasing up to a given value and then falling directly back to zero and then rising again and so on and so forth in a manner similar to the prior art analog ramps. To each frequency word, there corresponds a digitized ramp. Depending on the flow of the ramp values presented at its address bus, the memory 22 delivers an output sine signal sampled at the clock frequency. The output bus of the memory 22 has N bits. The sampled digital signal is therefore encoded on N bits. It is this signal that must subsequently be converted into sine analog signals. The output of the memory 22 constitutes the output of the means 1 for the generation of the samples of the signal to be synthesized.

FIG. 1 shows that a synthesizer according to the invention has, for example, an adder 4. This adder 4 adds the useful signal, encoded on N bits, and the signal given by the noise generation means 2, also encoded on N bits. The amplitudes of the useful signal and the noise signal are defined for example so that the result of the addition is encoded on N bits without overflow. The output of the adder 4 is connected for example to the input of the truncation means 5. The truncation consists simply in choosing the N most significant bits and setting aside the (N–M) least significant bits, M being smaller than N. Thus, the signal coming from the adder 4 is then for example truncated to M most significant bits, M being smaller than N, to get adapted to the dynamic range of the digital-analog converter 3 whose input enters the output of the truncation means 5.

The noise generation means 2 especially have a twofold role. They enable the decorrelation of the errors due to the truncation of the useful signal from N bits to M bits, especially by spreading the energy of these errors in the frequency spectrum. But above all, they improve the spectral purity of the synthesizer by reducing the effect of the non-linearities of the digital-analog converter 3.

Figure 4:
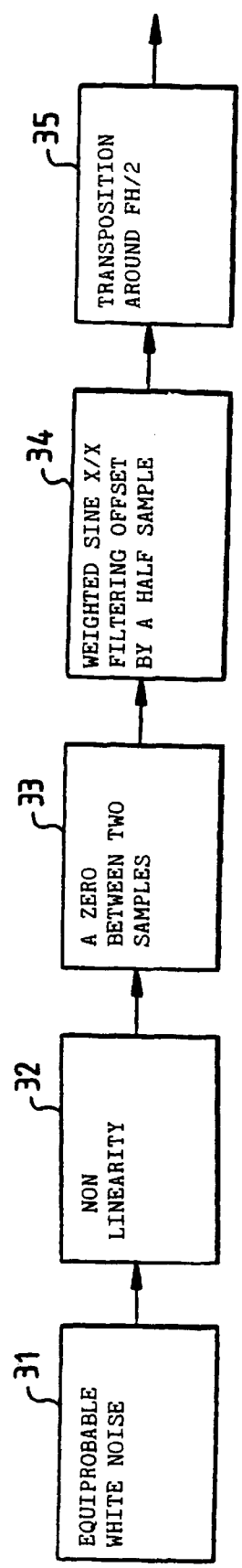
FIG. 4 shows an exemplary embodiment of noise generation means used in a synthesizer according to the invention.

FIG. 4 is a block diagram showing an exemplary possible embodiment of the noise generation means 2. Through these means, a sampled and equiprobable white noise is created. The sampling frequency is for example equal to half the sampling frequency of the useful signal. Then, this noise is subjected to non-linearities so as to increase the probability the appearance of the extreme amplitude values, reduce the probability of the appearance of the medium values and cancel out the probability outside the interval [$A_{min}$, $A_{max}$] mentioned here above. A zero sample is then added between two noise samples. Then, a filtering is carried out. This filtering is symmetrical and offset by a half-period of sampling of the noise. This filtering is, for example, a weighted sine(x)/x filtering. Finally, the noise is for example transposed around the clock frequency divided by 2, this frequency being the sampling frequency. Thus, the noise generation means 2 as shown in FIG. 4 comprise means for the generation of sampled white noise 31 followed by non-linearity creation means 32 which are followed by means 33 for interposing a zero between two noise samples. The noise created by these samples is then filtered by filtering means 34, for example weighted sine(x)/x filtering offset by a sampling half-period, these means 34 being followed by means 35 for the transposition of the signal thus filtered around the sampling frequency divided by 2, this sampling frequency being furthermore dictated by a clock signal.

The means for the creation of sampled white noise are for example constituted by a pseudo-random generator. The non-linearity creation means are for example constituted by digital transcoding means presenting a relationship between the input and the non-linear output. The interposing of a zero between two noise samples is for example done by a microprocessor or any other digital processing circuit. The weighted sine(x)/x filtering means 34 offset by a sampling half-period are for example obtained digitally. This filtering can be replaced by any filtering done by a symmetrical pulse response filter. Finally, the means 35 of transposition around half of the clock frequency are formed for example by means carrying out a multiplication of the samples alternately by +1 and by −1.

Figure 5:
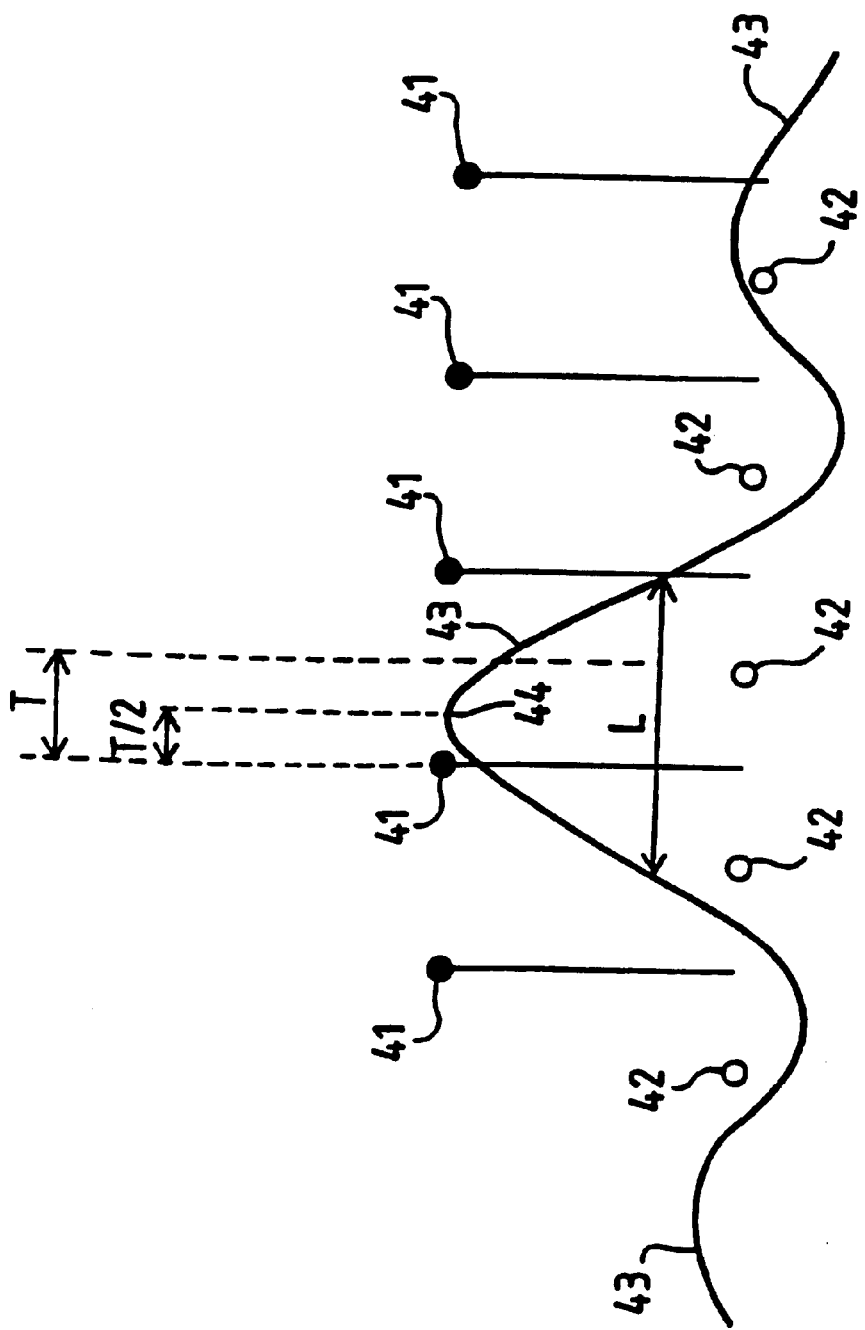
FIG. 5 shows an exemplary pulse response of the filtering used in the above-mentioned means.

FIG. 5 illustrates the noise samples with respect to the sine(x)/x filtering. The noise samples shown are those created after the interposing of the zeros. Thus, the noise signal shown has samples 41 that have been subjected for example to the non-linearities. Zeros 42 are interposed between the previous samples 41, the period between a non-zero sample 41 and a zero being equal to the sampling period T of the useful signal. A sine(x)/x curve 43 represents the pulse response of the filter of the filtering means 34. The peak 44 of this curve 43 is offset by a sampling half-period T/2 with respect to a non-zero noise sample 41. Furthermore, the width L of the main lobe of the pulse response of the filter acts on the steepness of the histogram 11. In other words, the smaller this width, the steeper are the slopes 111, 112 of the histogram as shown for example in FIG. 2, i.e. the greater is the speed at which the probability of the appearance P of noise goes from zero to the value of the plateau 110 and, in the same way, the greater is the speed at which this probability falls to zero. By contrast, a narrow lobe gives a wide spectrum, and this may lead to a compromise on the width of the lobe. The noise is thus perfectly localized and does not encroach on the band of useful signals. It is therefore possible to do the filtering after digital-analog conversion.

Furthermore, a high value of noise, as well as a histogram which is thus close to a square shape, makes it possible to properly smoothen out the non-linearities and therefore eliminate them. This result is all the better as the histogram is stationary. In the present case, a histogram is stationary if it remains the same whatever sub-group of noise samples. The shape of the histogram as well as its stationary quality are advantageously obtained in particular by the means 33 for interposing a zero between two samples and by the filtering that is symmetrical and offset by a half-sample 34.

Figure 6:
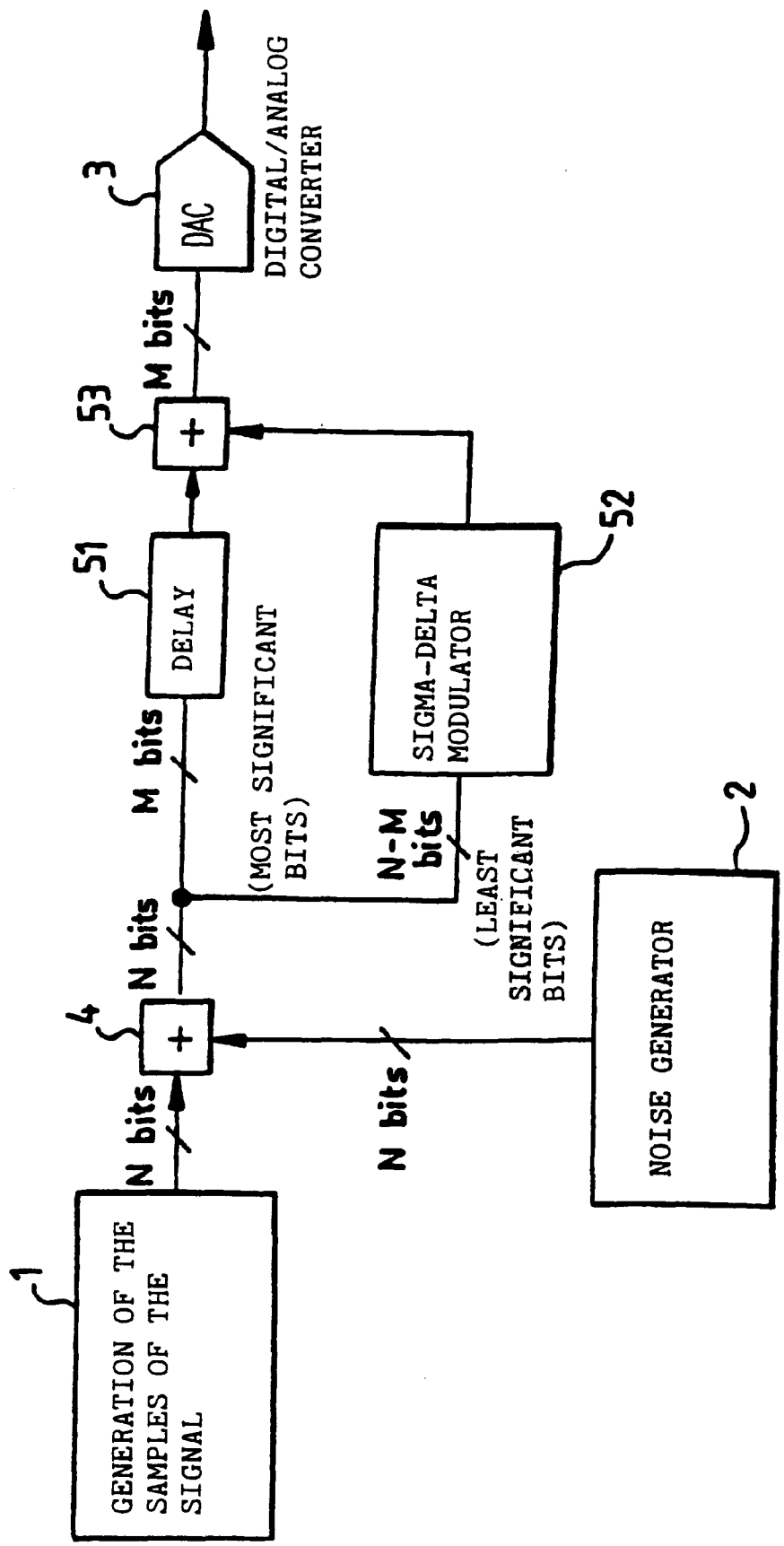
FIG. 6 shows another exemplary embodiment of a synthesizer according to the invention comprising especially a sigma-delta modulator to eliminate parasitic truncation lines.

FIG. 6 is a block diagram showing another possible embodiment of a synthesizer according to the invention. In this embodiment, a sigma-delta modulator is used to eliminate the truncation error constituted by the passage from N bits to M bits for the useful signal. The truncation is achieved herein for example at output of the adder 4 which takes the sum of the useful signal and the noise signal. It is clear that if there are non-linearities it is not necessary to try and eliminate the truncation errors, for the parasitic truncation lines remain buried in other parasitic lines, especially those due to non-linearities. However, given that the use of the noise generator 2 as decried here above enables the elimination of the non-linearities, it becomes advantageous, in a device according to the invention, to add a sigma-delta modulator as described hereinafter to eliminate the parasitic truncation lines.

The synthesizer again comprises means 1 to generate the useful signal and noise generation means 2 whose outputs, encoded on N bits, are added up by the adder 4. The synthesizer still has a digital-analog converter 3 at output. The noise generation means 2 are for example of the type shown in FIG. 5. The defects due to the non-linearities of the digital-analog converter 3 are processed especially by these noise generation means 2. The result of the addition of the useful signal and the noise signal is encoded on N bits because the amplitude and offset of the useful signal are chosen to prevent overflows. The N bit bus at output of the adder 4 is divided into two parts. A first bus comprising the M most significant bits is connected to a delay module 51. A second bus comprising the N–M least significant bits is connected to the sigma-delta modulator 52. The delay module 51 compensates for the delay introduced by the sigma-delta modulator for the processing of the N–M least significant bits. The output of the sigma-delta modulator 52 is added to the output of the delay module 51 by a second adder 53. The result of the addition, encoded on M bits, is converted into an analog signal by the digital-analog converter 3. The signal is especially encoded on M bits because care is taken to avoid overflows by appropriately choosing the amplitude and offset of the useful signal and of the noise signal.

Figure 7:
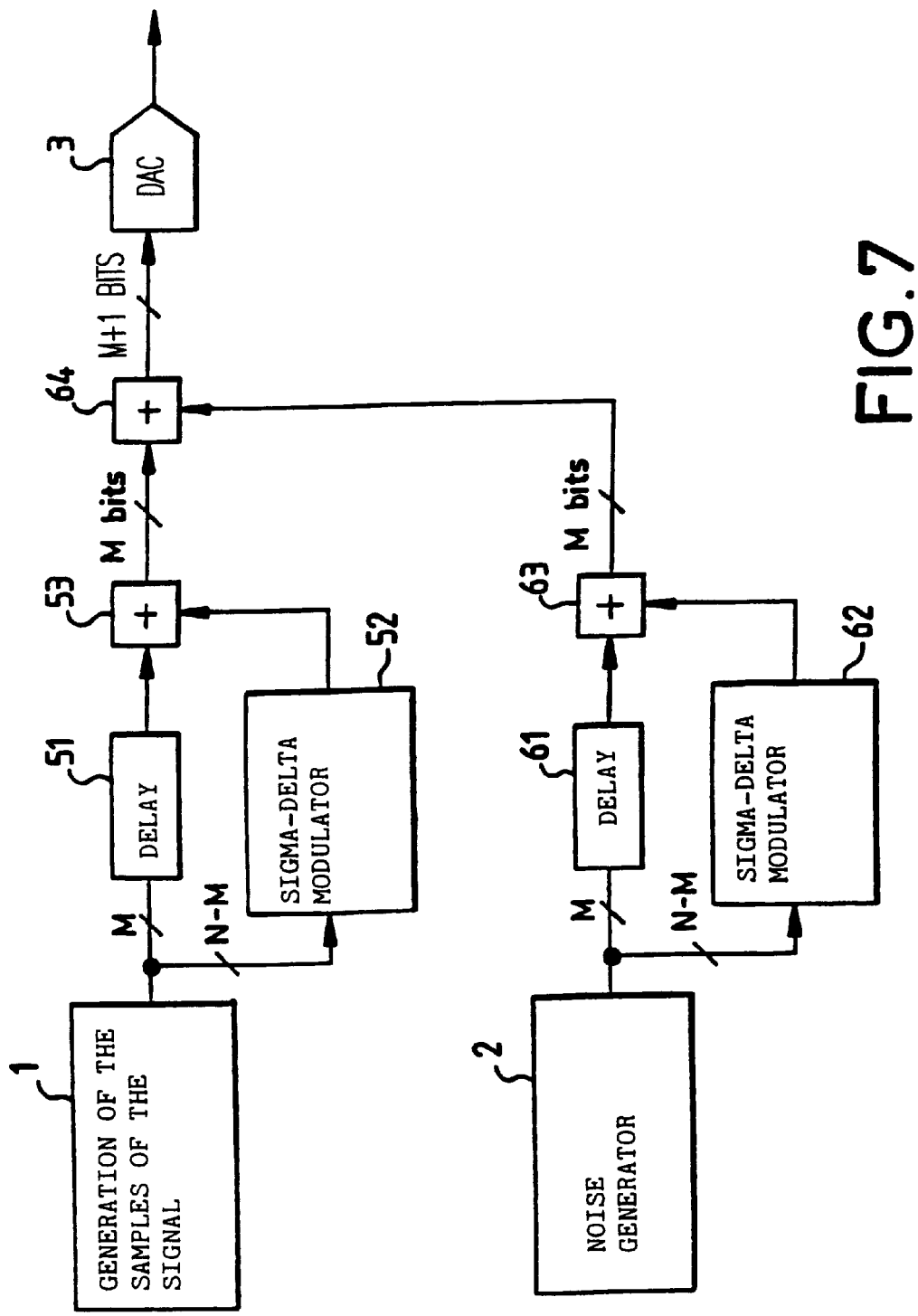
FIG. 7 shows another exemplary embodiment of a synthesizer according to the invention comprising two sigma-delta modulators to eliminate parasitic truncation lines.

FIG. 7 shows a block diagram of another possible exemplary embodiment of a synthesizer according to the invention. In this embodiment, two sigma-delta modulators 52, 62 are used to independently eliminate the truncation errors on the useful signal and the truncation errors on the noise signal before these two signals are added together, the useful signal and the noise signal being truncated before this addition. Since the useful signal is encoded on N bits, the output bus of the means 1 for the generation of this signal is divided into two parts. A first bus comprising the M most significant bits connected to a first delay module 51. A second bus comprising the N–M least significant bits is connected to the first sigma-delta modulator 52. The delay module 51 compensates for the delay introduced by the sigma-delta modulator for the processing of the N–M least significant bits. The output of the sigma-delta modulator 52 is added to the output of the delay module 51 by a first adder 53. Similarly, since the signal given by the noise generation means is encoded on N bits, the output bus of these means is divided into two parts. A first bus comprising the M most significant bits of the noise signal is connected to a second delay module 61. A second bus comprising the N–M least significant bits of the useful signal is connected to the second sigma-delta modulator 62. The delay module 61 compensates for the delay introduced by the sigma-delta modulator for the processing of the N–M least significant bits. The output of the second sigma-delta modulator 62 is added to the output of the second delay module 61 by a second adder 63. The results of the additions, at output of the first and second adders 53, 63 encoded on M bits, are added by a third adder 64. The result of the addition, given by this adder and encoded for example on M+1 bits, is converted into an analog signal by the digital-analog converter 3. In this arrangement, it is necessary to choose the amplitude and offset of the useful signal and of the noise signal so that the additions 53, 63 do not generate overflows. One useful aspect of an embodiment according to FIG. 7 lies especially in the fact that it enables a gain in computation power if the noise is generated by computation and recorded for example in a read-only memory. This makes it possible especially to save on equipment needed for the sigma-delta modulator, the delay 61 and the adder 63, for the action of this device is integrated into the computation means.

Figure 8:
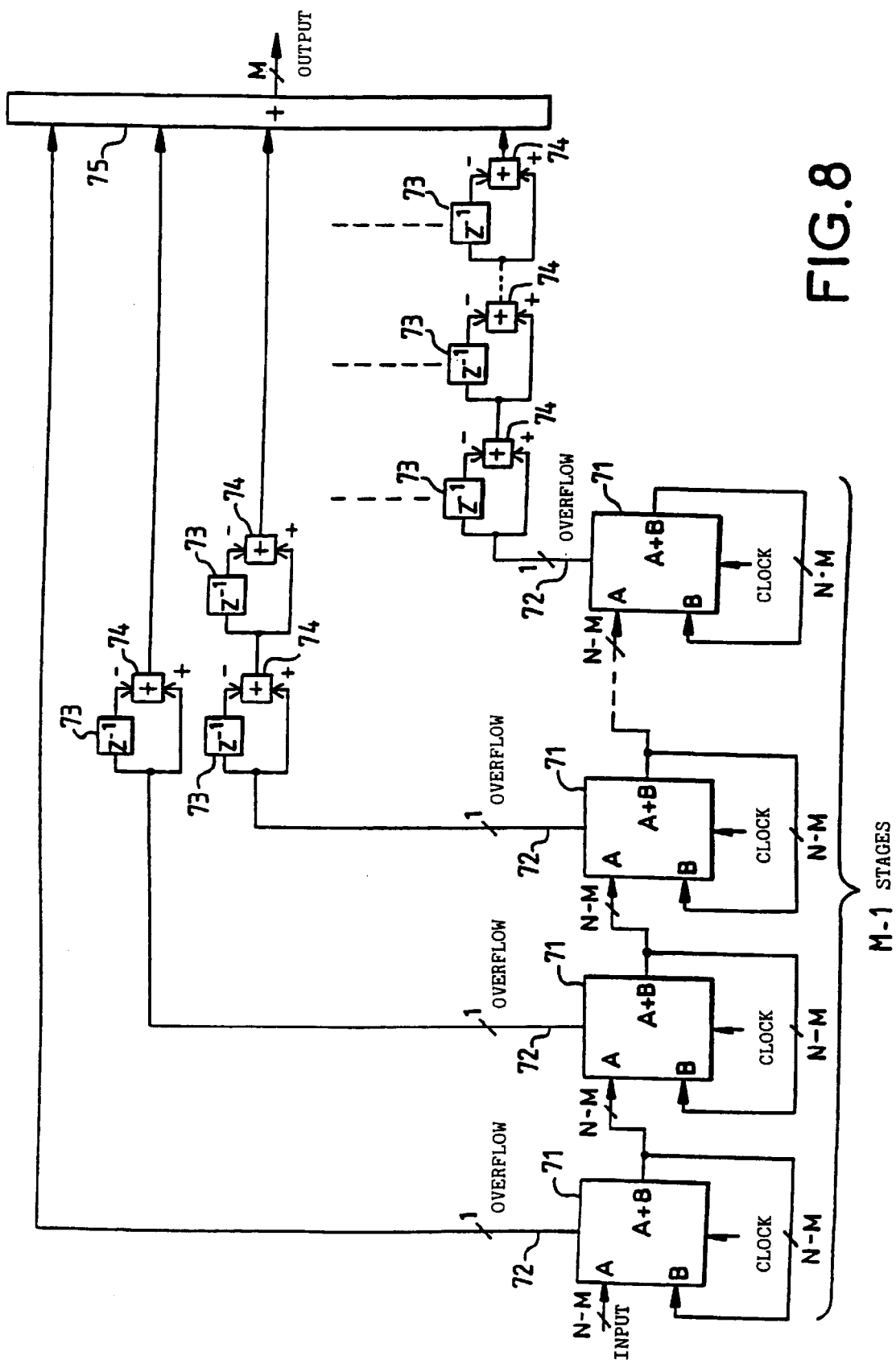
FIG. 8 shows an exemplary embodiment of a sigma-delta modulator used by the above exemplary embodiments.

FIG. 8 is a block diagram illustrating an exemplary sigma-delta modulator 52, 62 that can be laid out in a device according to the invention.

The sigma-delta modulator 21 according to FIG. 8 is formed for example by M–1 accumulation stages 71 that are cascade-connected, namely the input of the P order stage is the output of the P–1 stage. The number of stages of the modulator corresponds to its order. This number of accumulation stages 71 should be chosen for example so that the amplitude at output of the sigma-delta modulator 52, 62 is one order of magnitude below the amplitude of the generated noise signal 2 so as not to disturb the histogram of the noise amplitudes. An order of magnitude corresponds here for example to a ratio of 10. Each accumulation stage 71 has an overflow output 72. These outputs are combined with each other by an adder 75 through differentiation stages 73, 74 to give the output signal of the sigma-delta modulator 21 encoded on M bits. A differentiation stage comprises a delay element 73 and a subtractor element 74. The delay element 73, for example based on D type flip-flops, has in particular the function of enabling the synchronizing of the operations within the modulator 21. The input of a differentiation stage enters the input of the delay element 73 and the positive input of the subtractor element 74. The output of the delay element enters the negative input of the subtractor element which deducts the delayed signal from the input signal. An accumulation stage 71 comprises a first input A and a second input B encoded on N–M bits and an output A+B encoded on N–M bits which presents the addition of the two inputs A, B. This output enters both the first input A of the next stage and the second input B of its stage by looping. The input of the modulator is the first input A of the first stage. For each stage, the overflow bit 72 of the addition A+B enters the input of a first differentiation stage 73, 74 of a line of P–1 differentiation stages, P being the order of the accumulation stage 71. The adder 75 adds up the outputs of all the lines. The overflow bit of the first accumulation stage directly enters the adder 75. The output of the first differentiation stage of a line is –1, 0 or +1. Each differentiation stage 73, 74 can double the value of its input.

The invention therefore enables the efficient elimination of non-linearities while furthermore eliminating the truncation noises without any major increase in computation power. The invention is furthermore simple to implement since it uses only components, especially digital components that are not complicated in hardware terms. With regard to the software aspect, once the programs are made, they are installed in the components.

Furthermore, these programs are not particularly complicated to make.

What is claimed is:

1. A signal synthesizer comprising:
    a signal generator configured to generate N-bit samples of a useful signal corresponding to a frequency word received by the signal generator;
    a noise generator configured to generate an N-bit noise signal having a substantially equiprobable noise density, the noise density being zero outside of a predetermined range, and a histogram of the noise signal being stationary, the noise generator including,
        a white noise generator configured to generate samples of an equiprobable white noise having a noise sampling frequency and a noise sampling period,
        a digital processing circuit configured to interpose a zero between two samples of the equiprobable white noise, and a symmetrical pulsed response filter configured to filter an output of the digital processing circuit with an offset of one half of the noise sampling period;

an adder configured to add the useful signal to the noise signal to produce an N-bit resultant digital signal at an output of the adder; and a digital-analog converter configured to convert M most significant bits of the resultant digital signal into an analog signal, wherein M is less than N.

2. The signal synthesizer of claim 1, wherein an amplitude of the noise signal is substantially equal to an amplitude of the useful signal.

3. The signal synthesizer of claim 1, wherein an amplitude of the noise signal is greater than an amplitude of the useful signal.

4. The signal synthesizer of claim 1, wherein the noise generator further comprises:

a transposition device configured to transpose an output of the symmetrical pulsed response filter around a frequency equal to the noise sampling frequency divided by two.

5. The signal synthesizer of claim 1, wherein the noise generator further comprises:

a non-linearity device configured to create non-linearities in the equiprobable white noise.

6. The signal synthesizer of claim 1, wherein the symmetrical pulsed response filter comprises a $\sin(x)/(x)$ filter.

7. The signal synthesizer of claim 1, further comprising:

a sigma-delta modulator having an input and an output;

a delay module having an input and an output;

a second adder configured to add the output of the sigma-delta modulator to the output of the delay module to produce an M-bit signal at an output of the second adder; and an N-bit bus including, a first bus being M bits wide and configured to provide M most significant bits of the N-bit bus to the input of the delay module, and a second bus being N−M bits wide and configured to provide N−M least significant bits of the N-bit bus to the input of the sigma-delta modulator, wherein the resultant digital signal is output by the adder on the N-bit bus, the delay module is configured to delay the M most significant bits for a time equal to a processing time of the sigma-delta modulator, and the digital-analog converter is configured to convert the M-bit signal into an analog signal.

8. The signal synthesizer of claim 7, wherein:

the sigma-delta modulator comprises a maximum number of accumulation stages such that the output of the sigma-delta modulator has an amplitude being an order of magnitude below an amplitude of the noise signal.

9. A signal synthesizer comprising:

a signal generator configured to generate N-bit samples of a useful signal corresponding to a frequency word received by the signal generator;

a noise generator configured to generate an N-bit noise signal having a substantially equiprobable noise density, the noise density being zero outside of a predetermined range, and a histogram of the noise signal being stationary, the noise generator including, a white noise generator configured to generate samples of an equiprobable white noise having a noise sampling frequency and a noise sampling period, a digital processing circuit configured to interpose a zero between two samples of the equiprobable white noise, and a symmetrical pulsed response filter configured to filter an output of the digital processing circuit with an offset of one half of the noise sampling period;

a first sigma-delta modulator having an input and an output;

a second sigma-delta modulator having an input and an output;

a first delay module having an input and an output;

a second delay module having an input and an output;

a first adder configured to add the output of the first delay module to the output of the first sigma-delta modulator to produce an M-bit signal at an output of the first adder;

a second adder configured to add the output of the second delay module to the output of the second sigma-delta modulator to produce an M-bit signal at an output of the second adder;

a third adder configured to add the output of the first adder to the output of the second adder to produce an M+1 bit signal at an output of the third adder;

an N-bit useful signal bus including, a first useful signal bus being M bits wide and configured to provide M most significant useful signal bits of the N-bit useful signal bus to the input of the first delay module, and a second useful signal bus being N−M bits wide and configured to provide N−M least significant useful signal bits of the N-bit useful signal bus to the input of the first sigma-delta modulator;

an N-bit noise signal bus including, a first noise signal bus being M bits wide and configured to provide M most significant noise signal bits of the N-bit noise signal bus to the input of the second delay module, and a second noise signal bus being N−M bits wide and configured to provide N−M least significant noise signal bits of the N-bit noise signal bus to the input of the second sigma-delta modulator; and a digital-analog converter configured to convert the output of the third adder into an analog signal, wherein M is less than N, the useful signal is output by the signal generator on the N-bit useful signal bus, the first delay module is configured to delay the M most significant useful signal bits for a time equal to a processing time of the first sigma-delta modulator, the noise signal is output by the noise generator on the N-bit noise signal bus, and the second delay module is configured to delay the M most significant noise signal bits for a time equal to a processing time of the second sigma-delta modulator.

10. A signal synthesizer comprising:

a signal generation means for generating N-bit samples of a useful signal corresponding to a frequency word received by the signal generation means;

a noise generating means for generating an N-bit noise signal having a substantially equiprobable noise density, the noise density being zero outside of a predetermined range, and a histogram of the noise signal being stationary, the noise generating means including a white noise generating means for generating samples of an equiprobable white noise having a noise sampling frequency and a noise sampling period, an interposing means for interposing a zero between two samples of the equiprobable white noise, and a symmetrical pulsed response filtering means for filtering an output of the interposing means with an offset of one half of the noise sampling period;

an adder configured to add the useful signal to the noise signal to produce an N-bit resultant digital signal; and a digital-analog converter configured to convert M most significant bits of the resultant digital signal into an analog signal, wherein M is less than N.

11. The signal synthesizer of claim 10, wherein the noise generating means further comprises:

a transposition means for transposing an output of the symmetrical pulsed response filtering means around a frequency equal to the noise sampling frequency divided by two.

12. The signal synthesizer of claim 10, wherein the noise generating means further comprises:

a non-linearity creating means for creating non-linearities in the equiprobable white noise.

* * * * *